United States Patent
Pakulsky et al.

[11] Patent Number: 6,032,982
[45] Date of Patent: Mar. 7, 2000

[54] ENERGY ABSORBING B-PILLAR SEAT BELT MOUNTING ARRANGEMENT

[75] Inventors: Brian R. Pakulsky, Goodrich; Jim S. Stouppe, Ann Arbor; David Suchenek, Warren; Mark Voutyras, Farmington Hills, all of Mich.

[73] Assignee: Chrysler Corporation, Auburn Hills, Mich.

[21] Appl. No.: 08/963,750

[22] Filed: Nov. 4, 1997

[51] Int. Cl.[7] .................................................. B60R 22/28
[52] U.S. Cl. ...................... 280/805; 280/801.2; 297/472
[58] Field of Search ............................ 280/805, 801.2, 280/808; 297/470, 471, 472

[56] References Cited

U.S. PATENT DOCUMENTS

| | | | |
|---|---|---|---|
| 5,265,908 | 11/1993 | Verellen et al. | 280/801.2 |
| 5,330,144 | 7/1994 | Stevenson et al. | 248/231.9 |
| 5,344,188 | 9/1994 | Mims et al. | 280/808 |
| 5,529,344 | 6/1996 | Yasui et al. | 280/808 |
| 5,791,687 | 8/1998 | Gotou et al. | 280/805 |
| 5,842,719 | 12/1998 | Tanaka | 280/805 |

Primary Examiner—Paul N. Dickson
Attorney, Agent, or Firm—James R. Yee

[57] ABSTRACT

An energy absorbing mounting arrangement for a seat belt includes an anchorage assembly attached to a mounting plate. A D-ring is attached to the anchorage assembly and is operative for receiving a shoulder belt portion of the seat belt webbing. The anchorage assembly is preferably attached to the mounting plate at attachment points which are spaced apart on the mounting plate and are adapted to displace in an outboard direction when the anchorage assembly is subjected to a predetermined compression load. In one embodiment, the mounting plate is fixably attached to an inner side of the B-pillar and is formed to include a boss portion which passes through an aperture in the B-pillar. A fastener, such as a bolt, interconnects the anchorage assembly and the boss portion.

14 Claims, 3 Drawing Sheets

ENERGY ABSORBING B-PILLAR SEAT BELT MOUNTING ARRANGEMENT

BACKGROUND OF THE INVENTION

1. Technical Field

The present invention generally relates to safety restraints for motor vehicles. More particularly, the present invention relates to an energy absorbing seat belt mounting arrangement.

2. Discussion

Vehicle occupant restraint systems having a seat belt webbing and a guide for guiding the seat belt webbing are well known. In many known occupant restraint systems, a seat belt webbing guide is attached to the vehicle B-pillar. The seat belt webbing guide, which is commonly referred to as a D-ring, assists in positioning a shoulder belt portion of the seat belt diagonally across an occupant. In many applications, the D-ring is vertically adjustable to facilitate proper location of the shoulder belt portion.

Federal Motor Vehicle Safety Standard (FMVSS) requirements scheduled for gradual introduction beginning with the 1999 model year specify maximum HIC (head injury criteria) for various points along the vehicle B-pillar. In testing, the head of an anthropomorphic test device (ATD or test dummy) is impacted with the B-pillar at a predetermined speed at each of the various points. The HIC from the impact is derived with data obtained from a tri-axial accelerometer located on the ATD head.

One of the specific points on the B-pillar which must satisfy the FMVSS is the D-ring anchorage. The entire length of the anchorage must satisfy pertinent requirements. Targets can be located on decorative trim covering the anchorage or a portion of the anchorage.

A common technique for absorbing energy within vehicle occupant compartments is through the addition of foam, such as polystyrene or the like. While often desirable for certain applications, foam energy absorbers are associated with disadvantages. For example, foam energy absorbers intrude into the vehicle interior. Further, foam energy absorbers are not suitable for anchorage points. Thus, it is desirable to provide an improved mounting structure for a seat belt which absorbs energy.

SUMMARY OF THE INVENTION

It is a principal object of the present invention to provide an apparatus for attaching a seat belt webbing to a vehicle B-pillar which is capable of absorbing energy in the event a vehicle occupant encounters the apparatus during a collision.

It is a more particular object of the present invention to provide a mounting arrangement for a vehicle seat belt webbing capable of withstanding tensile forces experienced during vehicle impacts and further capable of deflecting under a predetermined compression load so as to absorb energy.

In one form, the present invention provides a mounting arrangement for interconnecting a seat belt webbing of a safety restraint system to a B-pillar of a motor vehicle. The mounting arrangement includes a mounting plate fixedly attached to the B-pillar at a first point on the mounting plate and a D-ring receiving the seat belt webbing. The D-ring is interconnected to the mounting plate. The first point of the mounting plate is adapted to withstand a predetermined tensile load without deforming and further adapted to displace in an outboard direction under a predetermined compression load. The predetermined tensile load has a magnitude substantially greater than the predetermined compression load.

In a more preferred form, the present invention provides an energy absorbing mounting arrangement for mounting a seat belt webbing of an occupant restraint system to a B-pillar of a motor vehicle. The mounting arrangement includes a mounting plate attached to an inner surface of the B-pillar and an anchorage assembly interconnected to the mounting plate at first and second points on the mounting plate. A D-ring is attached to the anchorage assembly. The D-ring is operative to guide a shoulder belt portion of the seat belt webbing. The first and second points of the mounting plate are adapted to displace in an outboard direction relative to an intermediate portion of the mounting plate when the anchorage assembly is subjected to a predetermined compression load.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
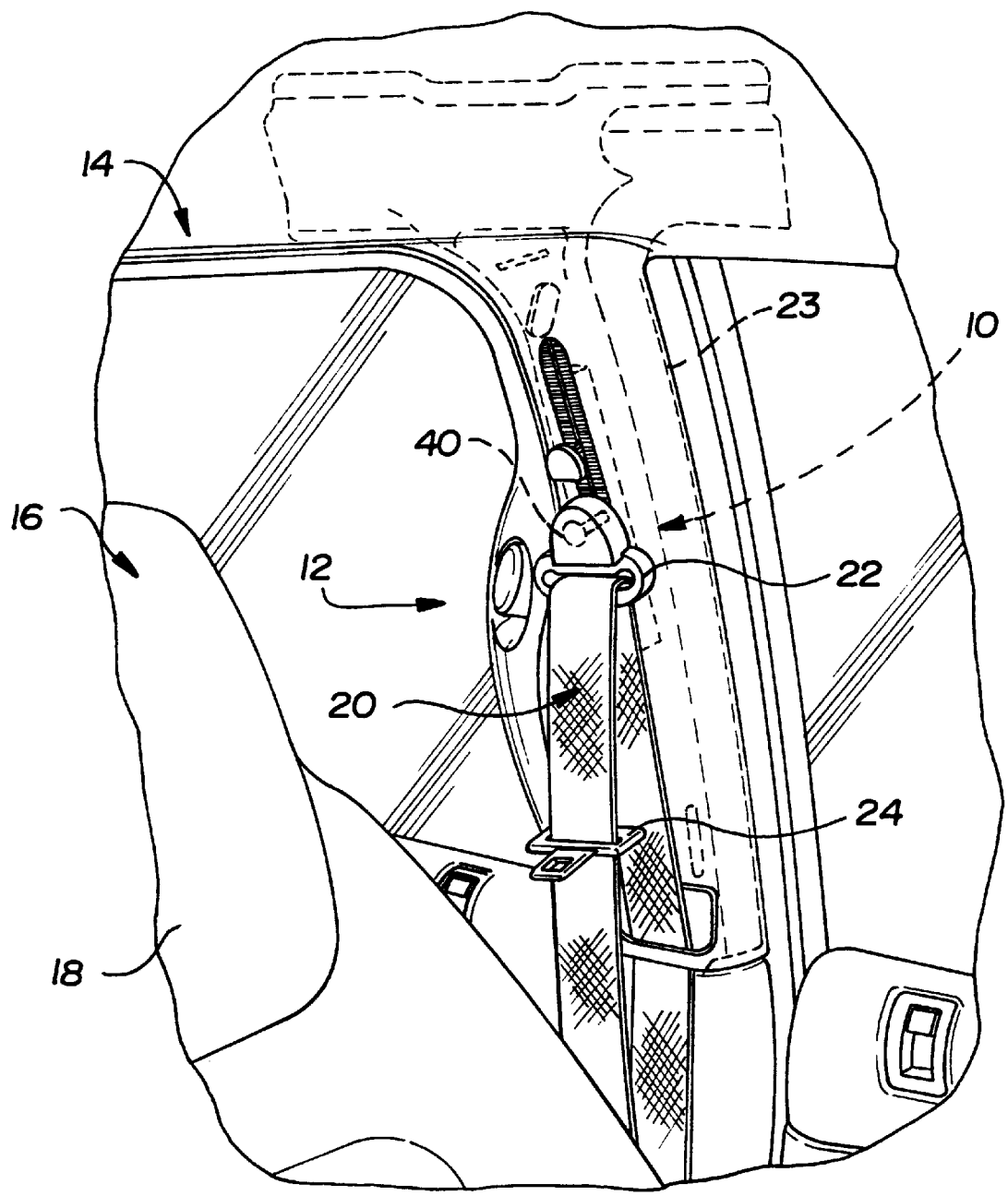
FIG. 1 is a partial view of an exemplary vehicle interior shown incorporating an energy absorbing seat belt mounting arrangement constructed in accordance with the teachings of a preferred embodiment of the present invention.

With reference to the environmental view of FIG. 1, an energy absorbing seat belt mounting arrangement constructed in accordance with the teachings of a preferred embodiment of the present invention is generally identified with reference numeral 10. The mounting arrangement 10 is illustrated incorporated into an exemplary occupant restraint system 12 of a motor vehicle 14. Prior to addressing the construction and function of the mounting arrangement 10, a brief understanding of the occupant restraint system 12 is warranted.

The present invention is illustrated in FIG. 1 as applied to a three-point vehicle safety belt system 12 for restraining forward movement of a vehicle occupant in the event of deceleration of the vehicle 14 above a predetermined magnitude, such as occurs in a vehicle collision. It should be understood that the present invention could be applied to other safety belt systems. A vehicle seat is illustrated as a front driver seat 16 in the vehicle 14. The vehicle seat 16 is of conventional construction including a seat back 18.

The vehicle safety belt system 12 includes a length of seat belt webbing 20 which is extendable about the vehicle occupant (not shown) in a conventional manner. While not specifically shown, it will be understood that the seat belt webbing 20 conventionally includes one end anchored to the floor of the vehicle body, passes through a D-ring 22 positioned along the B-pillar 23 and extends vertically downward to seat belt retractor (not shown) of known construction. A tongue assembly 24 is carried by the seat belt webbing 20 and is adapted to be received in a buckle secured to the vehicle body. When the tongue assembly 24 and buckle are joined, a shoulder belt section of the seat belt webbing 20 extends from the tongue assembly 24 diagonally across the seat back 18.

Figure 2:
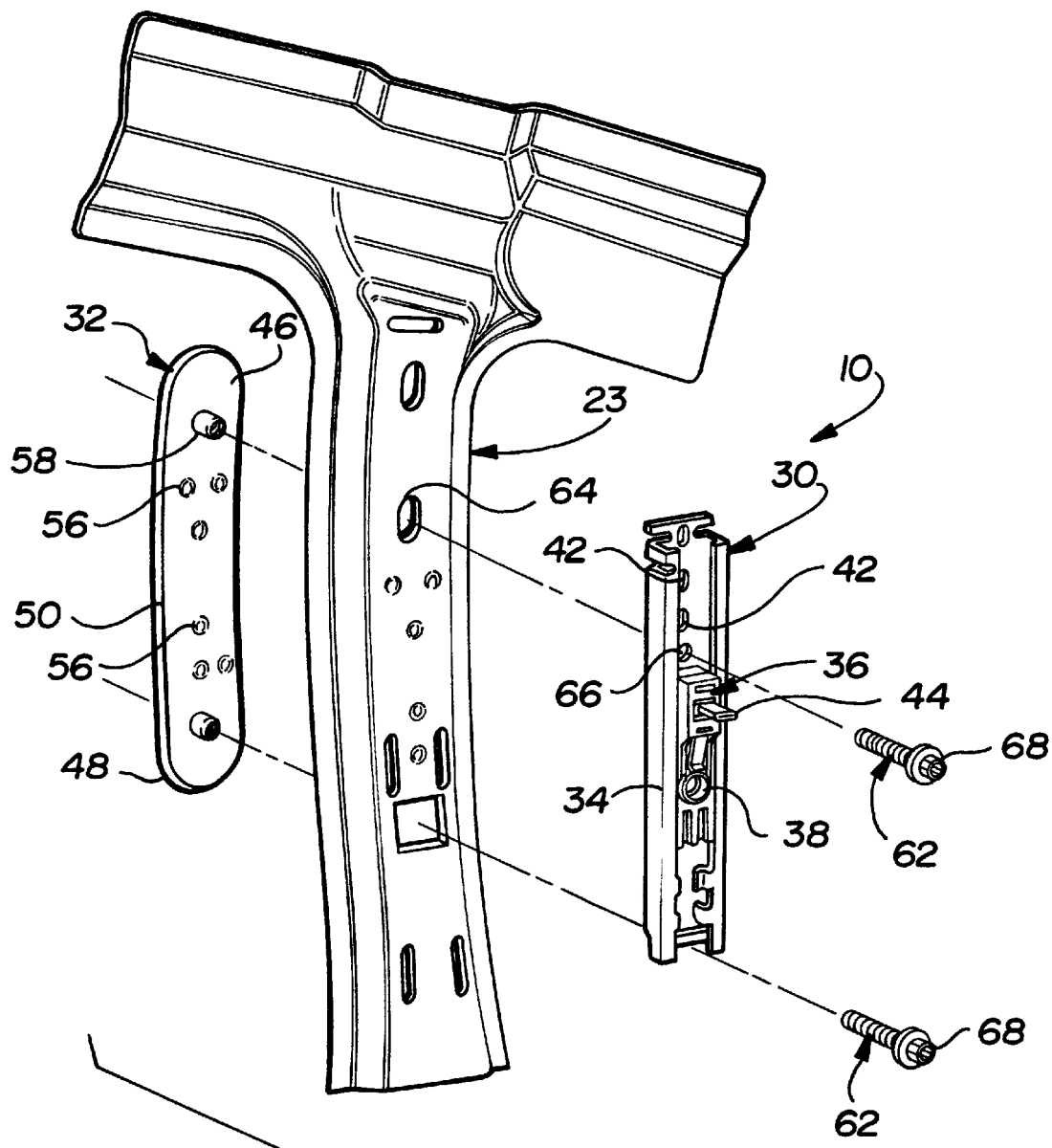
FIG. 2 is an enlarged and partially exploded perspective view of the energy absorbing seat belt mounting arrangement of the present invention shown operatively associated with a portion of the vehicle B-pillar.
Figure 3:
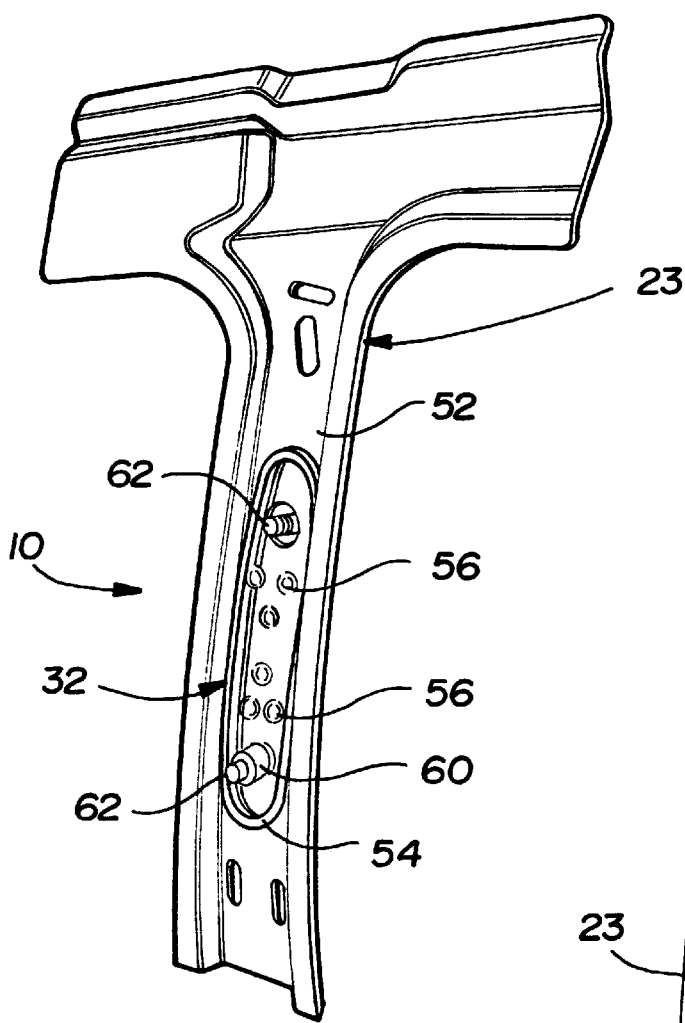
FIG. 3 is a rear perspective view of the energy absorbing seat belt mounting arrangement of the present invention shown attached to the B-pillar.
Figure 4:
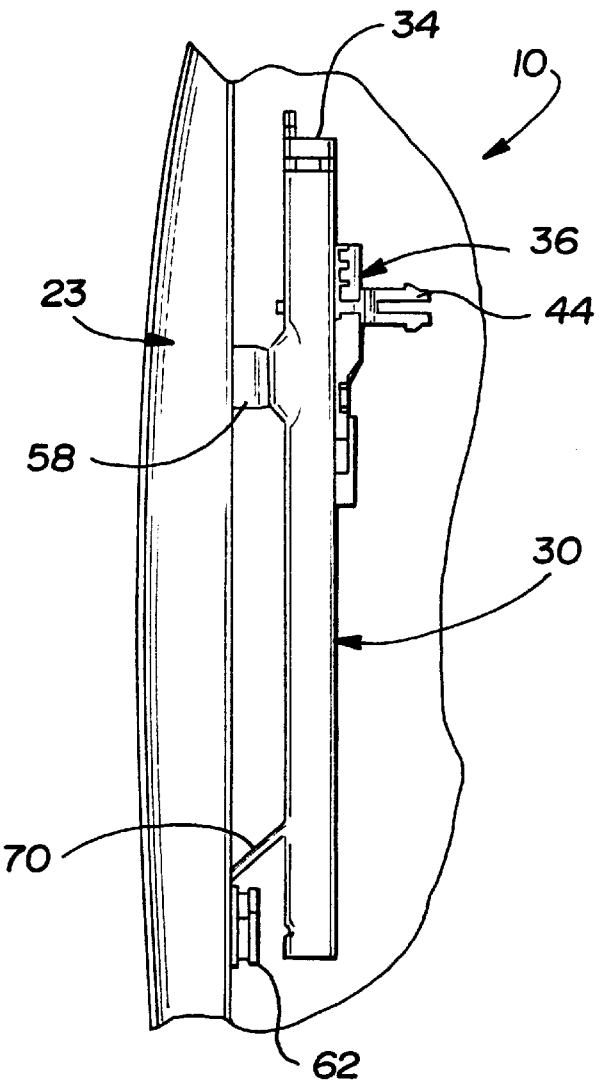
FIG. 4 is a side view of the energy absorbing seat belt mounting arrangement of FIGS. 2 and 3, further illustrating attachment to the B-pillar.

With continued reference to FIG. 1 and additional reference to FIGS. 2 through 4, the mounting arrangement 10 of the present invention will now be described. The mounting arrangement 10 is shown to include an anchorage assembly 30 and a mounting plate 32. The anchorage assembly 30, other than the manner in which it is interconnected to the B-pillar, is largely conventional in construction and need not be described in detail. Briefly, the anchorage assembly 30 includes a vertical elongated track 34 having a generally C-shaped cross section. The track 34 is adapted to receive a vertically adjustable unit 36 which has a tapped hole 38 for mounting of the D-ring 22 with a threaded fastener 40. The vertically adjustable unit 36 further includes a locating pin (not shown) which cooperates with a plurality of holes 42 located in the track 34 for positively locating the adjustable unit 36. A lever 44 outwardly extends from the vertically adjustable unit 36 which is operable for overcoming a spring force which normally biases the locating pin into engagement with one of the holes 42.

The tapping plate 32 includes a first end 46, a second end 48, and an intermediate portion 50, and is shown preferably attached to an inner side 52 of the B-pillar 23. Structural integrity of the mounting plate 32 is enhanced by a peripheral flange 54 which surrounds the mounting plate 32. The intermediate portion 56 of the mounting plate 32 is fixedly secured to the B-pillars 23 through welds 50.

In the exemplary embodiment illustrated, the anchorage assembly 30 is attached to the mounting plate 32 at first and second points 58 and 60 of the mounting plate 32 which are vertically spaced apart. The first and second points 58 and 60 of the mounting plate 32 are each preferably boss portions 58 and 60 integrally formed with the mounting plate 32 and internally threaded to each receive a threaded fastener 62.

The first boss portion 58 extends in an inboard direction through an aperture 64 provided in the B-pillar 23. The threaded fastener 62 which cooperates with the first boss portion 58 passes through an aperture 66 formed in the track 34 and through the first boss portion 58. The head 68 of the threaded fastener 62 is adapted to receive the locating pin of the vertically adjustable member 36. The second boss portion 60 is illustrated to extend in an outboard direction and is also internally threaded. The second boss portion 60 receives a fastener 62 which passes through an aperture (not specifically shown) provided in a stepped portion 70 integrally formed with the track 34 of the anchorage assembly 30.

The boss portions 58 and 60 of the mounting plate 32 are preferably formed through extrusion. It will be appreciated that the boss portions 58 and 60 may alternatively be formed to extend in the same direction, either inboard or outboard. In the exemplary embodiment illustrated, the boss portions 58 and 60 space the anchorage assembly 30 approximately 12 mm from the B-pillar 23.

In one exemplary application, the mounting plate 32 is unitarily constructed of cold rolled steel having a thickness of approximately 2.5 mm. However, alternative materials having suitable strength requirements may be utilized. In this particular application, the intermediate portion 50 of the mounting plate 32 is spot welded to the B-pillar 23 along a first horizontal line approximately 1.25 inches from a centerline of the first boss portion 58 and 1.25 inches from a centerline of the second boss portion 60. The spot welds 56 are preferably spaced approximately ⅜ inch from the edge of the tapping plate 32.

For the exemplary application described, the mounting arrangement 10 is able to withstand a tension load applied through the D-ring 22 of approximately 5,000 to 6,000 pounds. Further in this application, the first and second points 58 and 60 on the mounting plate are adapted to yield under a compression load applied to the anchorage assembly 30 of approximately 1,400 pounds.

While the above description constitutes the preferred embodiment of the invention, it will be appreciated that the invention is susceptible to modification, variation, and change without departing from the proper scope or fair meaning of the accompanying claims.

We claim:

1. In combination with a motor vehicle having a B-pillar and a safety restraint system including a seat belt webbing, a mounting arrangement for interconnecting the seat belt webbing to the B-pillar comprising:

an anchorage assembly disposed on a first side of the B-pillar;

a D-ring attached to the anchorage assembly and receiving the seat belt webbing; and an elongated mounting plate disposed on a second side of the B-pillar, the mounting plate including a generally planar portion secured to the second side of the B-pillar, the generally planar portion having a first end and a second end, the first end including a first boss portion extending through an aperture in the B-pillar and including a distal end spaced from the B-pillar, the second end including a second boss portion, the second boss portion extending away from the B-pillar, the first and second boss portions interconnected to the anchorage assembly such that a main body portion of the anchorage assembly is spaced from the B-pillar;

wherein the anchorage assembly further includes a stepped portion extending from the main body portion, the stepped portion abutting the B-pillar and secured to the second boss portion of the mounting plate.

2. The mounting arrangement for interconnecting the seat belt webbing to the B-pillar of claim 1, wherein the first boss portion is internally threaded and wherein the mounting arrangement includes a fastener passing through the anchorage assembly and the B-pillar and threadably engaging the first boss portion.

3. The mounting arrangement for interconnecting the seat belt webbing to the B-pillar of claim 1, wherein the D-ring is vertically adjustable on the anchorage assembly.

4. The mounting arrangement for interconnecting the seat belt webbing to the B-pillar of claim 1, wherein the mounting plate includes a central portion fixedly attached to the B-pillar.

5. The mounting arrangement for interconnecting the seat belt webbing to the B-pillar of claim 1, wherein the second boss portion is internally threaded and wherein the mounting arrangement includes a fastener passing through the anchorage assembly and the B-pillar and threadably engaging the second boss portion.

6. In combination with a motor vehicle having a B-pillar and a safety restraint system including a seat belt webbing, a mounting arrangement for interconnecting the seat belt webbing to the B-pillar comprising:
- an anchorage assembly disposed on a first side of the B-pillar;
- a D-ring attached to the anchorage assembly and receiving the seat belt webbing; and
- an elongated mounting plate disposed on a second side of the B-pillar, the mounting plate including a generally planar portion secured to the second side of the B-pillar, the generally planar portion having a first end and a second end, the first end including a first boss portion extending through an aperture in the B-pillar and including a distal end spaced from the B-pillar, the first boss portion interconnected to the anchorage assembly such that a main body portion of the anchorage assembly is spaced apart from the B-pillar, the mounting plate further including a peripheral flange bordering at least a portion of the first and second ends.

7. The mounting arrangement for interconnecting the seat belt webbing to the B-pillar of claim 6, wherein the second end includes a second boss portion, the second boss portion extending away from the B-pillar, the second boss portion interconnected to the anchorage assembly.

8. The mounting arrangement for interconnecting the seat belt webbing to the B-pillar of claim 6, wherein the first boss portion is internally threaded and wherein the mounting arrangement includes a fastener passing through the anchorage assembly and the B-pillar and threadably engaging the first boss portion.

9. The mounting arrangement for interconnecting the seat belt webbing to the B-pillar of claim 6, wherein the D-ring is vertically adjustable on the anchorage assembly.

10. The mounting arrangement for interconnecting the seat belt webbing to the B-pillar of claim 6, wherein the mounting plate includes a central portion fixedly attached to the B-pillar.

11. The mounting arrangement for interconnecting the seat belt webbing to the B-pillar of claim 7, wherein the second boss portion is internally threaded and wherein the mounting arrangement includes a fastener passing through the anchorage assembly and the B-pillar and threadably engaging the second boss portion.

12. The mounting arrangement for interconnecting the seat belt webbing to the B-pillar of claim 7, wherein the anchorage assembly further includes a stepped portion extending from the main body portion, the stepped portion abutting the B-pillar and secured to the second boss portion of the mounting plate.

13. The mounting arrangement for interconnecting the seat belt webbing to the B-pillar of claim 6, wherein the peripheral flange completely borders the generally planar portion of the mounting plate.

14. The mounting arrangement for interconnecting the seat belt webbing to the B-pillar of claim 6, wherein the peripheral flange extends away from the B-pillar.

* * * * *